(12) United States Patent
Chen et al.

(10) Patent No.: US 11,427,085 B2
(45) Date of Patent: Aug. 30, 2022

(54) LONG STATOR POWER SUPPLY SECTION AND LONG STATOR LINEAR MOTOR FOR MAGLEV TRAIN

(71) Applicant: CRRC ZHUZHOU ELECTRIC LOCOMOTIVE RESEARCH INSTITUTE CO., LTD., Hunan (CN)

(72) Inventors: Gaohua Chen, Hunan (CN); Jianghua Feng, Hunan (CN); Benyu Xin, Hunan (CN); Rongjun Ding, Hunan (CN); Kuisen Tian, Hunan (CN); Shuying Guo, Hunan (CN)

(73) Assignee: CRRC ZHUZHOU ELECTRIC LOCOMOTIVE RESEARCH INSTITUTE CO., LTD., Hunan (CN)

( * ) Notice: Subject to any disclaimer, the term of this patent is extended or adjusted under 35 U.S.C. 154(b) by 412 days.

(21) Appl. No.: 16/634,150

(22) PCT Filed: Oct. 10, 2017

(86) PCT No.: PCT/CN2017/105435
§ 371 (c)(1),
(2) Date: Jan. 26, 2020

(87) PCT Pub. No.: WO2019/024243
PCT Pub. Date: Feb. 7, 2019

(65) Prior Publication Data
US 2020/0207215 A1     Jul. 2, 2020

(30) Foreign Application Priority Data
Aug. 3, 2017  (CN) .......................... 201710655823.1

(51) Int. Cl.
*B60L 13/10*  (2006.01)
*H02K 1/16*  (2006.01)
(Continued)

(52) U.S. Cl.
CPC .............. *B60L 13/10* (2013.01); *H02K 1/165* (2013.01); *H02K 3/12* (2013.01); *H02K 3/28* (2013.01);
(Continued)

(58) Field of Classification Search
CPC .......... B60L 13/10; H02K 1/16; H02K 1/165; H02K 3/12; H02K 3/28; H02K 3/30;
(Continued)

(56) References Cited

U.S. PATENT DOCUMENTS 6,140,735 A * 10/2000 Kato ........................ H02K 3/28
                                                                 310/201
6,288,470 B1 * 9/2001 Breit ........................ H02K 3/30
                                                                 310/254.1
(Continued)

FOREIGN PATENT DOCUMENTS

| CN | 1456458 A | 11/2003 |
|---|---|---|
| CN | 1460865 A | 12/2003 |

(Continued)

OTHER PUBLICATIONS

International Search Report for PCT/CN2017/105435 dated Mar. 28, 2018, ISA/CN.
(Continued)

*Primary Examiner* — Rashad H Johnson
(74) *Attorney, Agent, or Firm* — Yue (Robert) Xu; Apex Attorneys at Law, LLP

(57) ABSTRACT

A long stator power supply section and a long stator linear motor for a maglev train, comprising a plurality of stator core modules (1) and stator coils (2) equal in number to the stator core modules (1). Each stator of the plurality of stator coils (2) is correspondingly embedded into one stator core module of the stator core modules (1) respectively; joints are arranged at both ends of each stator coil (2); the stator coils
(Continued)

(2) on every two adjacent stator core modules (1) are detachably connected by means of the joints; and the joints of the stator coils (2) on the stator core modules (1) at both ends are connected to a feeder cable.

19 Claims, 3 Drawing Sheets

(51) Int. Cl.
  *H02K 3/12*  (2006.01)
  *H02K 3/28*  (2006.01)
  *H02K 3/30*  (2006.01)
  *H02K 3/48*  (2006.01)
  *H02K 3/50*  (2006.01)
  *H02K 41/02*  (2006.01)

(52) U.S. Cl.
  CPC ............... *H02K 3/30* (2013.01); *H02K 3/48* (2013.01); *H02K 3/505* (2013.01); *H02K 41/02* (2013.01)

(58) Field of Classification Search
  CPC ............ H02K 3/48; H02K 3/50; H02K 3/505; H02K 41/02
  USPC ............ 104/281; 310/12.16, 24, 25, 26
  See application file for complete search history.

(56) References Cited

U.S. PATENT DOCUMENTS

| | | | | |
|---|---|---|---|---|
| 6,357,359 | B1 * | 3/2002 | Davey | B60L 13/10 104/282 |
| 6,476,524 | B1 | 11/2002 | Miyamoto et al. | |
| 8,109,040 | B2 * | 2/2012 | Finke | E05F 15/60 49/404 |
| 2003/0227269 | A1 | 12/2003 | Fischperer | |
| 2006/0145543 | A1 | 7/2006 | Hoffman et al. | |
| 2007/0051269 | A1 * | 3/2007 | Reichel | E01B 25/32 104/286 |
| 2008/0284254 | A1 | 11/2008 | Munk et al. | |
| 2010/0072835 | A1 * | 3/2010 | Klatt | H02K 5/00 29/598 |
| 2013/0313948 | A1 * | 11/2013 | Zucker | H02K 11/33 310/68 D |
| 2013/0342085 | A1 * | 12/2013 | Tsui | B60L 1/14 310/67 R |
| 2021/0376707 | A1 * | 12/2021 | McDonald | H02K 41/02 |
| 2022/0140668 | A1 * | 5/2022 | Tschida | H02K 1/16 310/216.008 |

FOREIGN PATENT DOCUMENTS

| | | |
|---|---|---|
| CN | 1461096 A | 12/2003 |
| CN | 1738734 A | 2/2006 |
| CN | 1771369 A | 5/2006 |
| CN | 1842956 A | 10/2006 |
| CN | 201893633 U | 7/2011 |
| CN | 203660857 U | 6/2014 |
| DE | 19833418 A1 | 6/1999 |
| DE | 102012101188 A1 | 8/2012 |

OTHER PUBLICATIONS

CNIPA First Office Action corresponding to Application No. 201710655823.1; dated Jan. 6, 2020.

* cited by examiner

LONG STATOR POWER SUPPLY SECTION AND LONG STATOR LINEAR MOTOR FOR MAGLEV TRAIN

The present application is a national phase application of PCT international patent application PCT/CN2017/105435, filed on Oct. 10, 2017 which claims the priority to Chinese patent application No. 201710655823.1 titled "LONG STATOR POWER SUPPLY SECTION AND LONG STATOR LINEAR MOTOR FOR MAGLEV TRAIN", filed with the China National Intellectual Property Administration on Aug. 3, 2017, the entire disclosures of which are incorporated herein by reference in their entireties.

FIELD

The present application relates to the technical field of long stator linear motors, and in particular to a long stator power supply section and a long stator linear motor for a maglev train.

BACKGROUND

With the development of means of transportation, the maglev train has become a travel choice for more and more people because of its advantages such as high speed and high safety. The maglev train generally uses a long stator linear motor. The long stator linear motor mounted on the rail beam is composed of multiple long stator power supply sections (of which a typical length is 1200 m). Specifically, referring to FIG. 1, FIG. 1 is a schematic view showing the structure of a long stator power supply section in a long stator linear motor in the conventional technology. Each of the multiple long stator power supply sections is composed of a long stator iron core (composed of multiple stator iron core modules, of which a typical length is 1032 mm) and a long stator coil. Specifically, in each of the multiple long stator power supply sections, after the multiple stator iron core modules are laid, cables are wound to a design size by large dedicated winding equipment and then embedded into the slots of the multiple stator iron core modules to form the long stator coil, and long enough cables are left at a head end and a tail end of the long stator coil to connect feed cables.

However, the long stator linear motor of the above structure has the following disadvantages:

1) When installing the long stator power supply sections, the stator iron core modules are laid on the rail beam first, then the rail beam is installed to the railway line to form the long stator iron core, and then the large dedicated winding equipment is used to complete the embedded winding of the long stator coil to form the long stator power supply section. On the one hand, the construction processes are serial and the construction period is long; on the other hand, large dedicated winding equipment is required, and the cost is high.

2) The length of each long stator power supply section reaches several hundred meters or even kilometers. If one stator iron core module therein is damaged and required to be replaced, it is required to disassemble the whole long stator coil first, then remove the damaged stator iron core module, and after a new stator core module is replaced, the long stator coil is required to be re-wound. If the long stator coil is damaged, it is required to rewind the long stator coil after the damaged long stator coil is replaced. On the one hand, because the long stator coil is very long, it is very difficult to disassemble and rewind the long stator coil, causing the railway line to stop, and the repair time is in units of weeks; and on the other hand, the material waste of the long stator coil is very serious.

Therefore, how to provide a solution to solve the above technical problems is a problem to be solved by those skilled in the art at present.

SUMMARY

One object of the present application is to provide a long stator power supply section and a long stator linear motor for a maglev train, which have the following advantages: the construction processes are parallel, the on-site construction period is shortened, the laying precision of the long stator iron cores on the rail beam is improved, no large dedicated winding equipment is required, the cost is low, the difficulty of disassembly and re-embedding is low, the line repair time is short, and the waste of the stator coil is reduced.

In order to solve the above technical problems, a long stator power supply section for a maglev train is provided according to the present application, which includes multiple stator iron core modules and multiple stator coils equal in number to the multiple stator iron core modules, where the multiple stator coils are embedded in the multiple stator iron core modules in one-to-one correspondence, connectors are provided at two ends of each of the multiples stator coils, stator coils on each two adjacent stator iron core modules are detachably connected through the connectors, and the connectors of stators coils on the stator iron core modules at the head end and the tail end of the long stator power supply section are connected to feed cables.

Preferably, each of the multiple stator iron core modules includes multiple laminated stator punching sheets, each of the multiple stator punching sheets includes a fastening slot, a dovetail slot and multiple stator slots, each of the multiple stator iron core modules further includes a fastener for fastening the multiple stator punching sheets through the fastening slot and a dovetail slot support plate for fastening the multiple stator punching sheets through the dovetail slot.

Preferably, the fastener includes a fastening bolt and a nut fit to the fastening bolt.

Preferably, each of the multiple stator slots is a circular slot.

Preferably, each of the multiple stator slots is a polygonal slot.

Preferably, each of the multiple stator coils includes a linear coil bar embedded in the stator slots and an end coil bar for connecting the connector. In each of the multiple stator coils, each two adjacent linear coil bars are welded to each other, and each adjacent linear coil bar and end coil bar are welded to each other.

Preferably, each of the multiple stator coils is externally wrapped with a polyimide insulating layer.

Preferably, each of the multiple stator coils is externally wrapped with a mica insulating layer.

Preferably, a male connector and a female connector are respectively provided at two ends of each of the multiple stator coils, where one end of the male connector is provided with a threaded hole for connecting the end coil bar, another end of the male connector is provided with a threaded rod, one end of the female connector is provided with a threaded hole for connecting the end coil bar, and another end of the female connector is provided with a threaded hole for connecting the threaded rod.

In order to solve the above technology problems, a long stator linear motor for a maglev train is further provided according to the present application, which includes multiple long stator power supply sections as described above.

A long stator power supply section for a maglev train is provided according to the present application. The long stator power supply section according to the present application includes multiple stator iron core modules, and further includes multiple stator coils equal in number to the multiple stator iron core modules, where the multiple stator coils are embedded in the multiple stator iron core modules in one-to-one correspondence. Therefore, when installing the long stator power supply sections, factory manufacturing can be achieved, the rail beam with the stator iron core modules can be assembled in the factory, and the stator winding is not required to be laid on the railway line. On the one hand, the construction processes are parallel, the on-site construction period is shortened, the laying precision of the long stator iron cores on the rail beam is improved; and on the other hand, no large dedicated winding equipment is required, and the cost is low. In addition, since one stator iron core module is in correspondence to one stator coil, the length of the stator coil is not too long. Moreover, two adjacent stator coils are detachably connected through the connector. Therefore, when one stator iron core module is damaged and needs to be replaced or when the stator coil is damaged and needs to be replaced, only the stator coil on the damaged stator iron core module or the damaged stator coil needs to be disassembled. On the one hand, the difficulty of disassembly and re-embedding is low, and the line repair time is short, and on the other hand, the waste of the stator coil is reduced.

A long stator linear motor for a maglev train is provided according to the present application, which includes the multiple long stator power supply sections as described above and has the same advantages as the above long stator power supply sections.

BRIEF DESCRIPTION OF THE DRAWINGS

To illustrate the technical solutions in the embodiments of the present application more clearly, drawings required in description of the conventional technology and embodiments will be introduced simply in the following. It is obvious that the drawings in the following description are only some embodiments of the present application, and other drawings may be obtained by those skilled in the art based on the drawings without creative efforts.

DETAILED DESCRIPTION OF EMBODIMENTS

The core of the present application is to provide a long stator power supply section and a long stator linear motor for a maglev train, which have the following advantages: the construction processes are parallel, the on-site construction period is shortened, the laying precision of the long stator iron cores on the rail beam is improved, no large dedicated winding equipment is required, the cost is low, the difficulty of disassembly and re-embedding is low, the line repair time is short, and the waste of the stator coil is reduced.

In order to make the objectives, technical solutions and advantages of embodiments of the present application clearer, the technical solutions according to the embodiments of the present application will be described clearly and completely as follows in conjunction with the drawings. It is apparent that the described embodiments are only a few rather than all of the embodiments according to the present application. Based on the embodiments of the present application, all other embodiments, made by the those skilled in the art without any creative efforts, fall into the scope of the present application.

Figure 1:
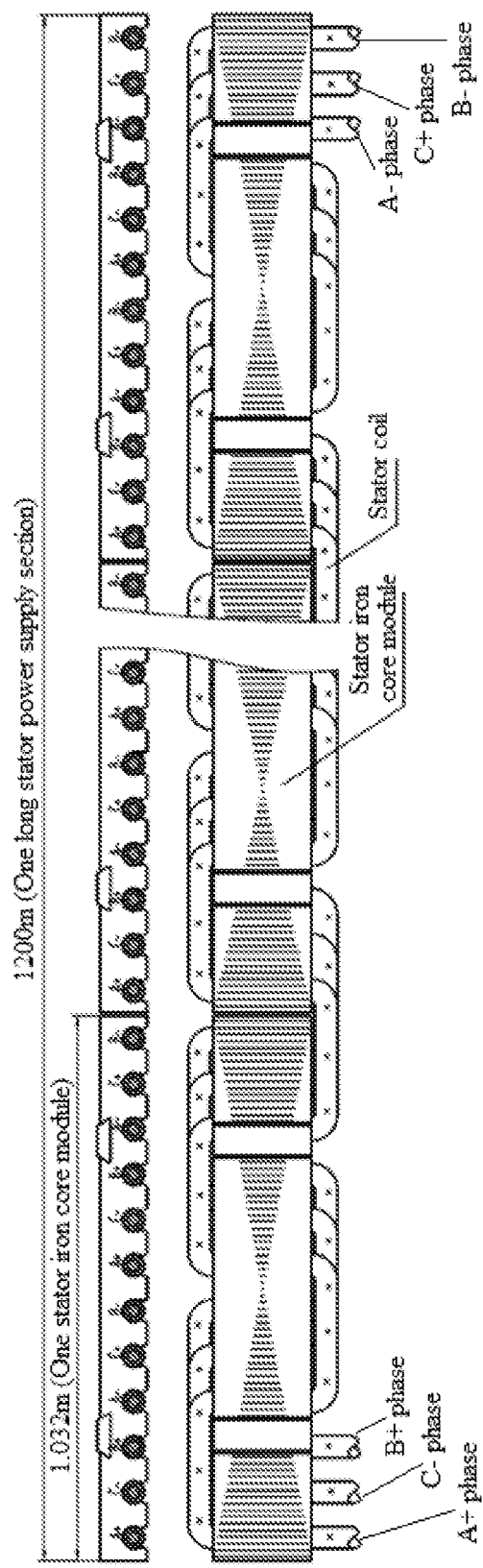
FIG. 1 is a schematic view showing the structure of a long stator power supply section in a long stator linear motor in the conventional technology.
Figure 2:
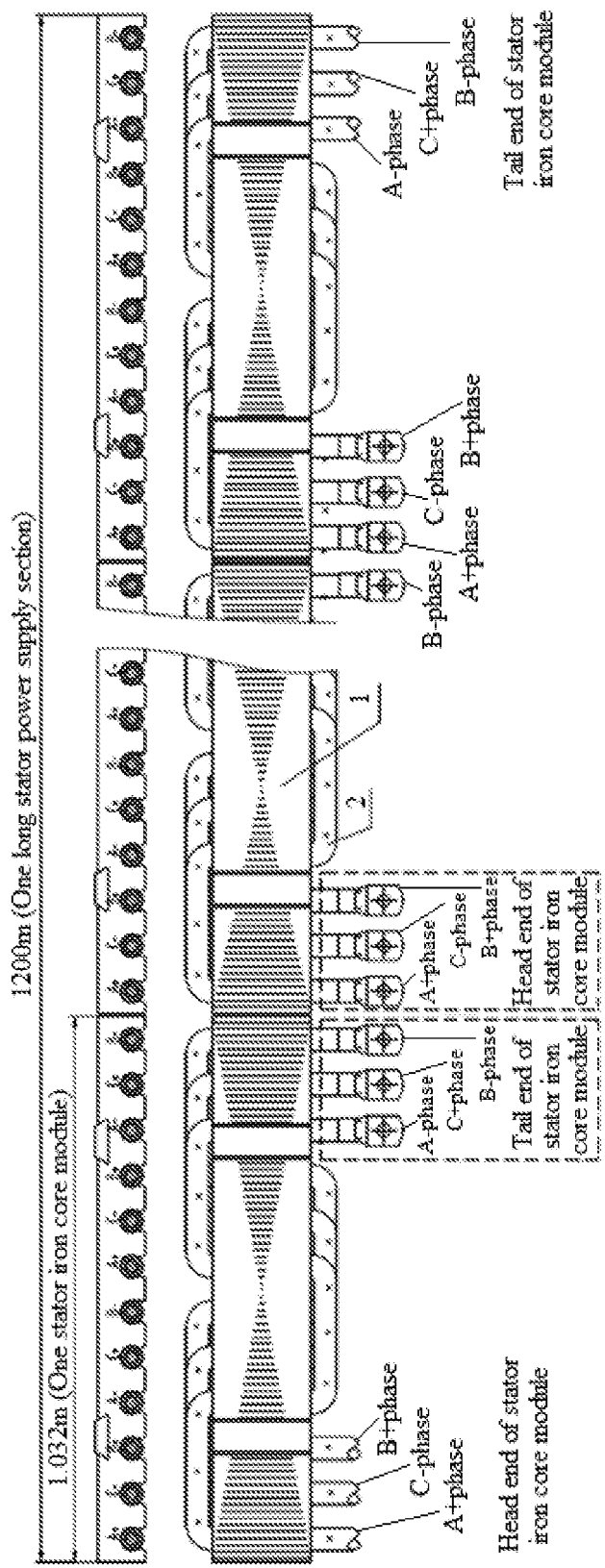
FIG. 2 is a schematic view showing the structure of a long stator power supply section for a maglev train according to the present application.

Referring to FIG. 2, FIG. 2 is a schematic view showing the structure of a long stator power supply section for a maglev train according to the present application.

The long stator power supply section includes multiple stator iron core modules 1 and multiple stator coils 2 equal in number to the multiple stator iron core modules 1, the multiple stator coils 2 are embedded in the multiple stator iron core modules 1 in one-to-one correspondence, connectors are provided at two ends of each of the multiples stator coils 2, stator coils 2 on each two adjacent stator iron core modules 1 are detachably connected through the connectors, and the connectors of stators coils 2 on the stator iron core modules 1 at a head end and a tail end of the long stator power supply section are connected to feed cables.

It can be understood that, compared with the conventional technology that a long stator power supply section includes multiple stator iron core modules and one stator coil, the long stator power supply section according to the present application includes multiple stator iron core basic units, and each of the multiple stator iron core basic units includes a stator iron core module 1 and stator coil ends. In the multiple stator iron core basic units, the number of the stator coils 2 is equal to the number of the stator iron core modules 1, so that, compared to the stator coil 2 in the conventional technology, the length of each of the multiple stator coils 2 according to the present application is greatly reduced. In order to facilitate subsequent replacement, the stator coils 2 on each two adjacent stator iron core modules 1 are detachably connected through the connectors, and the connectors of the stator coils 2 on the stator iron core modules 1 at the head end and the tail end of the long stator power supply section are connected to feed cables.

Specifically, since the length of each of the multiple stator coils 2 is not too long, such that factory manufacturing can be achieved. Specifically, the stator iron core modules 1 can be laid on the rail beam in the factory, and the stator coils 2 can be embedded in the already laid stator iron core modules 1 when laying the stator iron core modules 1 on the other rail beam, thereby achieving the parallel proceeding of the construction and greatly shortening the construction period. The precise laying is easier to achieve, and the laying precision of the stator iron core modules 1 on the rail beam is improved. In addition, when one stator iron core module 1 is damaged and needs to be replaced, only the stator coil 2 on the damaged stator iron core module 1 needs to be disassembled, and other stator coils 2 on the well stator iron core modules 1 don't need to be disassembled. After the disassembly is completed, a new stator iron core module 1 is replaced, and then the stator coil 2 is embedded in the new stator iron core module 1. When one stator coil 2 is damaged and needs to be replaced, only the damaged stator coil 2 needs to be disassembled, and the well stator coils 2 on the other stator iron core modules 1 don't need to be disassembled. After the disassembly is completed, it is only needed to replace a new stator coil 2. Since the stator coil 2 is short, the difficulty of disassembly and re-embedding is low, and the line repair time is short, and on the other hand, the waste of the stator coil 2 is greatly reduced.

A long stator power supply section for a maglev train is provided according to the present application. The long stator power supply section according to the present application includes multiple stator iron core modules, and further includes multiple stator coils equal in number to the multiple stator iron core modules, where the multiple stator coils are embedded in the multiple stator iron core modules in one-to-one correspondence. Therefore, when installing the long stator power supply sections, factory manufacturing can be achieved, the rail beam with the stator iron core modules can be assembled in the factory, and the stator winding is not required to be laid on the railway line. On the one hand, the construction processes are parallel, the on-site construction period is shortened, the laying precision of the long stator iron cores on the rail beam is improved; and on the other hand, no large dedicated winding equipment is required, and the cost is low. In addition, since one stator iron core module is in correspondence to one stator coil, the length of the stator coil is not too long. Moreover, two adjacent stator coils are detachably connected through the connector. Therefore, when one stator iron core module is damaged and needs to be replaced or when the stator coil is damaged and needs to be replaced, only the stator coil on the damaged stator iron core module or the damaged stator coil needs to be disassembled. On the one hand, the difficulty of disassembly and re-embedding is low, and the line repair time is short, and on the other hand, the waste of the stator coil is reduced.

Based on the above embodiments, the following preferred embodiments can be obtained.

As a preferred embodiment, each of the multiple stator iron core modules 1 includes multiple laminated stator punching sheets, each of the multiple stator punching sheets includes a fastening slot, a dovetail slot and multiple stator slots, each of the multiple stator iron core modules 1 further includes a fastener 3 for fastening the multiple stator punching sheets through the fastening slot and a dovetail slot support plate 4 for fastening the multiple stator punching sheets through the dovetail slot.

Figure 3:
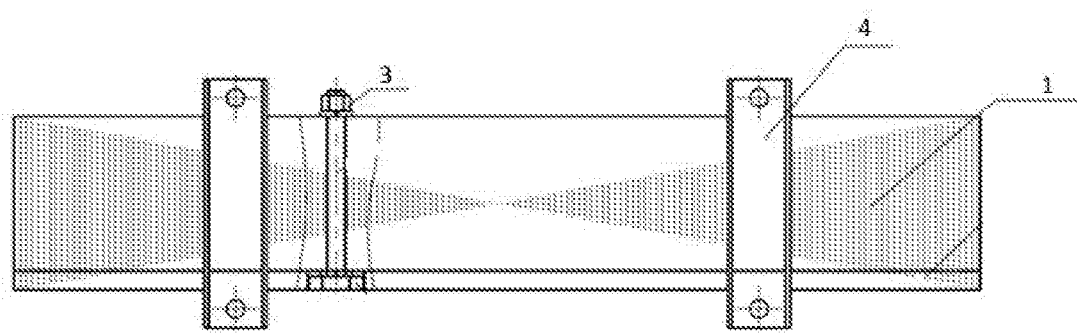
FIG. 3 is a schematic view showing the assembly structure of a stator iron core basic unit according to the present application.

Specifically, referring to FIG. 3, FIG. 3 is a schematic view showing the assembly structure of the stator iron core basic unit according to the present application. Each of the multiple stator iron core modules 1 according to the present application is composed of multiple laminated stator punching sheets. In order to ensure the stability of the multiple stator punching sheets, each of the multiple stator iron core modules 1 further includes the fastener 3 fastened by the fastening slot and the dovetail slot support plate 4 fastened by the dovetail slot.

As a preferred embodiment, the multiple stator punching sheets are 1032 mm long and 89.5 mm high, and the theoretical thickness of a single sheet is 0.35 mm to 0.5 mm.

Specifically, the dovetail support plate 4 may be welded in the dovetail slot. The welding has the advantages of good connection performance, and high air tightness and water tightness. The dovetail support plate 4 may be fastened by other means, which is not particularly limited in the present application.

In addition, as a preferred embodiment, the number of the fastening slots may be two, the number of the dovetail slots may be two, and the number of the stator slots may be twelve. Apparently, the number of the above slots may be other values, which is not particularly limited in the present application, and may be determined according to practical situation.

Specifically, in a case that there are twelve stator slots, considering that the phase number of the stator coil 2 is three, each phase coil occupies four stator slots.

As a preferred embodiment, the fastener 3 includes a fastening bolt and a nut fit to the fastening bolt.

Specifically, the fastening bolt herein may be made of high-strength alloy or polygonal angle steel. The bolt connection has the advantages of good connection performance, being easy to assemble and disassemble, and being convenient to maintain. Apparently, the fastener 3 herein may be also be other type, which is not particularly limited in the present application, and may be determined according to practical situation.

When the multiple stator iron core modules 1 are assembled, the multiple stator punching sheets are laminated, the head of the fastening bolt is placed in the fastening slot of the stator punching sheet at an end, and the rod of the fastening bolt passes through a hole of the fastening slot with a diameter of 9 mm, fastened by the nut. The dovetail support plate 4 passes through the dovetail slot to allow the dovetail support plate 4 to be welded to the stator punching sheets, thereby securing the multiple stator punching sheets as a whole.

As a preferred embodiment, each of the multiple stator slots is a circular slot.

As a preferred embodiment, each of the multiple stator slots is a polygonal slot.

Specifically, in order to adapt to the various practical situations of the stator coils 2 in the practical application and to fully exploit the magnetic permeability of the multiple stator punching sheets, the stator slot in the present application may be a circular slot or a polygonal slot. The polygonal slot may be a quadrilateral slot or a pentagonal slot or a hexagonal slot, which is not particularly limited in the present application, and may be determined according to practical situation.

As a preferred embodiment, each of the multiple stator coils 2 includes a linear coil bar embedded in the stator slots and an end coil bar for connecting the connector. In each of the multiple stator coils 2, each two adjacent linear coil bars are welded to each other, and each adjacent linear coil bar and end coil bar are welded to each other.

Specifically, since the cables used in the stator coils 2 in the conventional technology are all flexible, on the one hand, it is difficult to embed the stator coils 2 into the stator iron core modules 1, and on the other hand, in order to easily embed the coils into the stator iron core modules 1, the opening of the stator slot cannot be too narrow, which also leaves a hidden danger that the cables may fall off from the opening of the stator slot and the driving safety may be seriously affected.

In view of this, the multiple stator coil 2 according to the present application is provided in a form of a hard coil bar, which facilitates the embedding of the stator coil 2, further decreases the difficulty of disassembly and re-embedding, and reduces the line repair time. In addition, since the coil bar can be directly inserted into the stator slot, the opening of the stator slot can be narrower, which reduces the equivalent coefficient of the slot opening of the stator slot, reduces the equivalent air gap, increases the mutual inductance between the stator iron core module 1 and the secondary part (suspended electromagnet), reduces the stator leakage reactance component, and improves the performance index of the long stator.

Specifically, each of the multiple stator coils 2 includes a conductive layer and an insulating layer. The conductive layer according to the present application may be a round bar, a square bar, a round pipe, or a square pipe with excellent electrical conductivity. The coil bar may be solid or hollow, which is not particularly limited in the present application. As a preferred embodiment, each of the multiple stator coils 2 is externally wrapped with a polyimide insulating layer.

As a preferred embodiment, each of the multiple stator coils 2 is externally wrapped with a mica insulating layer.

It should be noted that each of the multiple stator coils 2 includes a conductive layer and an insulating layer. The stator coil 2 in the conventional technology is formed by a cable. The insulating layer wrapped around the cable is usually a polyvinyl chloride insulating layer or a rubber insulating layer. The insulating properties of the polyvinyl chloride insulating layer and the rubber insulating layer are poor. Therefore, in order to meet the voltage withstanding requirement, the insulating layer is thick. On the one hand, the cross-sectional area of the conductive portion only accounts for about 30% of the cross-sectional area of the cable, and the utilization ratio of the cable and the stator slot is very low. On the other hand, the thick insulation layer also makes the heat dissipation capability of the cable very poor. If the heat of the cable cannot be dissipated in time and effectively, it may cause a safety accident and affect the service life of the cable.

In the present application, the insulating layer is made of a polyimide insulating layer or a mica insulating layer. and the polyimide insulating layer and the mica insulating layer have the advantages of very high insulating property and easy molding. Compared with the polyvinyl chloride insulating layer and the rubber insulating layer used in the conventional technology, under the same voltage withstanding requirement, the polyimide insulating layer and the mica insulating layer are thinner. Thus, under a same diameter requirement, because the polyimide insulating layer and the mica insulating layer are thinner, the diameter of the conductive layer can be larger, so that the conductive area is large, and the electrical conductivity is increased, thereby increasing the power of the traction system of the maglev train. In addition, the utilization ratio of the stator coil 2 and the stator slot is increased, the heat dissipation is fast, and the service life of the stator coil 2 is prolonged.

As a preferred embodiment, a male connector 6 and a female connector 5 are respectively provided at two ends of each stator coil 2, where one end of the male connector 6 is provided with a threaded hole for connecting the end coil bar, another end of the male connector 6 is provided with a threaded rod, one end of the female connector 5 is provided with a threaded hole for connecting the end coil bar, and another end of the female connector is provided with a threaded hole for connecting the threaded rod.

Figure 4:
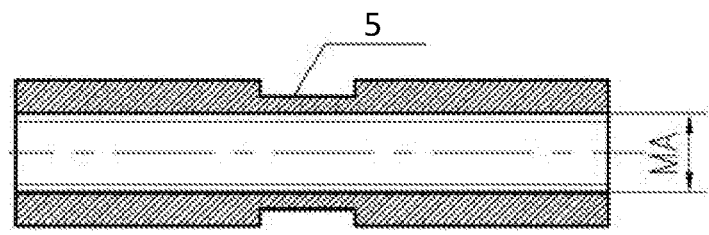
FIG. 4(a) is a schematic view showing the structure of a female connector according to the present application.
FIG. 4(b) is a schematic view showing the structure of a male connector according to the present application.
Figure 4:
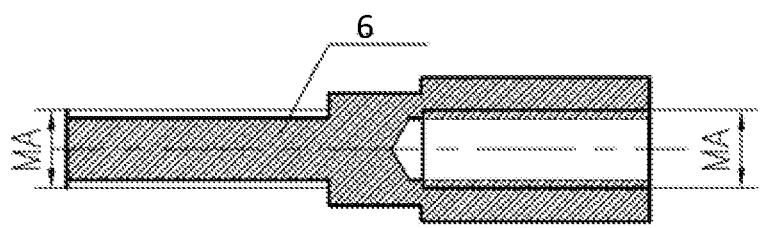

Specifically, referring to FIGS. 4(a) and 4(b), FIG. 4(a) is a schematic view showing the structure of a female connector according to the present application; and FIG. 4(b) is a schematic view showing the structure of a male connector according to the present application. The female connector 5 may be provided with an internal thread penetrating through the length of a pipe. The threaded connection has the advantages of being simple to manufacture and use, reliable connection, good versatility, and being detachable and reusable. In addition, the connector herein may be connected by other methods, which is not particularly limited in the present application.

In order to solve the above technology problems, a long stator linear motor for a maglev train is further provided according to the present application, which includes multiple long stator power supply sections as described above.

For description of the long stator linear motor according to the present application, reference may be made to the above embodiments, which is not repeated herein again.

It should be noted that the relationship terminologies such as "first", "second" and the like are only used herein to distinguish one entity or operation from another, rather than to necessitate or imply that an actual relationship or order exists between the entities or operations. Moreover, terms such as "include", "have" or any other variants thereof are meant to cover non-exclusive inclusion, so that the process, method, item or apparatus including a series of elements is not limited to those elements, and may include other elements that are not specifically listed or that are inherent in the process, method, item or apparatus. With no other limitations, an element restricted by the phrase "include a . . . " does not exclude the existence of other identical elements in the process, method, item or apparatus including the element.

Based on the above description of the disclosed embodiments, those skilled in the art can implement or deploy the present application. Various modifications to these embodiments are obvious to a person skilled in the art, the general principles defined herein may be implemented in other embodiments without departing from the spirit and scope of the present application. Therefore, the present application is not limited to these embodiments illustrated herein, but should be defined by the broadest scope consistent with the principles and novel features disclosed herein.

The invention claimed is:

1. A long stator power supply section for a maglev train, comprising a plurality of stator iron core modules and a plurality of stator coils equal in number to the plurality of the stator iron core modules, wherein
the plurality of the stator coils are embedded in the plurality of the stator iron core modules in one-to-one correspondence, a connector is respectively provided at two ends of each of the plurality of the stator coils, stator coils on each two adjacent stator iron core modules are detachably connected through the connector, and the connectors of stators coils on the stator iron core modules at a head end and a tail end of the long stator power supply section are connected to feed cables.

2. The long stator power supply section according to claim 1, wherein each of the plurality of the stator iron core modules comprises a plurality of laminated stator punching sheets, each of the plurality of the stator punching sheets comprises a fastening slot, a dovetail slot and a plurality of stator slots, each of the plurality of the stator iron core modules further comprises a fastener configured to fasten the plurality of the stator punching sheets through the fastening slot and a dovetail slot support plate configured to fasten the plurality of the stator punching sheets through the dovetail slot.

3. The long stator power supply section according to claim 2, wherein the fastener comprises a fastening bolt and a nut fit to the fastening bolt.

4. The long stator power supply section according to claim 2, wherein each of the plurality of the stator slots is a circular slot.

5. The long stator power supply section according to claim 2, wherein each of the plurality of the stator slots is a polygonal slot.

6. The long stator power supply section according to claim 2, wherein
    each of the plurality of the stator coils comprises a linear coil bar embedded in the plurality of the stator slots and an end coil bar configured to connect the connector; and
    in each of the plurality of the stator coils, each two adjacent linear coil bars are welded to each other, and each adjacent linear coil bar and end coil bar are welded to each other.

7. The long stator power supply section according to claim 6, wherein each of the plurality of stator coils is externally wrapped with a polyimide insulating layer.

8. The long stator power supply section according to claim 7, wherein
    a male connector and a female connector are respectively provided at two ends of each of the plurality of the stator coils;
    one end of the male connector is provided with a threaded hole for connecting the end coil bar, and another end of the male connector is provided with a threaded rod; and
    one end of the female connector is provided with a threaded hole for connecting the end coil bar, and another end of the female connector is provided with a threaded hole for connecting the threaded rod.

9. The long stator power supply section according to claim 6, wherein each of the plurality of the stator coils is externally wrapped with a mica insulating layer.

10. The long stator power supply section according to claim 9, wherein
    a male connector and a female connector are respectively provided at two ends of each of the plurality of the stator coils;
    one end of the male connector is provided with a threaded hole for connecting the end coil bar, and another end of the male connector is provided with a threaded rod; and
    one end of the female connector is provided with a threaded hole for connecting the end coil bar, and another end of the female connector is provided with a threaded hole for connecting the threaded rod.

11. A long stator linear motor for a maglev train, comprising a plurality of long stator power supply sections wherein each of the long stator power supply sections comprises a plurality of stator iron core modules and a plurality of stator coils equal in number to the plurality of the stator iron core modules,
    the plurality of the stator coils are embedded in the plurality of the stator iron core modules in one-to-one correspondence, a connector is respectively provided at two ends of each of the plurality of the stator coils, stator coils on each two adjacent stator iron core modules are detachably connected through the connector, and the connectors of stators coils on the stator iron core modules at a head end and a tail end of the long stator power supply section are connected to feed cables.

12. The long stator linear motor for the maglev train according to claim 11, wherein each of the plurality of the stator iron core modules comprises a plurality of laminated stator punching sheets, each of the plurality of the stator punching sheets comprises a fastening slot, a dovetail slot and a plurality of stator slots, each of the plurality of the stator iron core modules further comprises a fastener configured to fasten the plurality of the stator punching sheets through the fastening slot and a dovetail slot support plate configured to fasten the plurality of the stator punching sheets through the dovetail slot.

13. The long stator linear motor for the maglev train according to claim 12, wherein the fastener comprises a fastening bolt and a nut fit to the fastening bolt.

14. The long stator linear motor for the maglev train according to claim 12, wherein each of the plurality of the stator slots is a circular slot.

15. The long stator linear motor for the maglev train according to claim 12, wherein each of the plurality of the stator slots is a polygonal slot.

16. The long stator linear motor for the maglev train according to claim 12, wherein
    each of the plurality of the stator coils comprises a linear coil bar embedded in the plurality of the stator slots and an end coil bar configured to connect the connector; and
    in each of the plurality of the stator coils, each two adjacent linear coil bars are welded to each other, and each adjacent linear coil bar and end coil bar are welded to each other.

17. The long stator linear motor for the maglev train according to claim 16, wherein each of the plurality of stator coils is externally wrapped with a polyimide insulating layer.

18. The long stator linear motor for the maglev train according to claim 17, wherein
    a male connector and a female connector are respectively provided at two ends of each of the plurality of the stator coils;
    one end of the male connector is provided with a threaded hole for connecting the end coil bar, and another end of the male connector is provided with a threaded rod; and
    one end of the female connector is provided with a threaded hole for connecting the end coil bar, and another end of the female connector is provided with a threaded hole for connecting the threaded rod.

19. The long stator linear motor for the maglev train according to claim 16, wherein each of the plurality of the stator coils is externally wrapped with a mica insulating layer.

* * * * *